(12) United States Patent
Baraga et al.

(10) Patent No.: US 12,085,167 B2
(45) Date of Patent: Sep. 10, 2024

(54) DRIVE DEVICE FOR A MOTOR VEHICLE, AND MOTOR VEHICLE

(71) Applicant: Mercedes-Benz Group AG, Stuttgart (DE)

(72) Inventors: Michael Baraga, Stuttgart (DE); Henrik Kalczynski, Stuttgart (DE); Markus Brandenburg, Esslingen (DE); Nico Kronimus, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 16 days.

(21) Appl. No.: 18/041,305

(22) PCT Filed: Jul. 13, 2021

(86) PCT No.: PCT/EP2021/069399
§ 371 (c)(1),
(2) Date: Feb. 10, 2023

(87) PCT Pub. No.: WO2022/033786
PCT Pub. Date: Feb. 17, 2022

(65) Prior Publication Data
US 2023/0323942 A1 Oct. 12, 2023

(30) Foreign Application Priority Data
Aug. 14, 2020 (DE) ...................... 10 2020 004 976.1

(51) Int. Cl.
*F16H 63/34* (2006.01)
*F16H 57/04* (2010.01)
(Continued)

(52) U.S. Cl.
CPC ..... *F16H 63/3483* (2013.01); *F16H 57/0436* (2013.01); *F16H 57/0446* (2013.01);
(Continued)

(58) Field of Classification Search
CPC ............. F16H 63/3483; F16H 57/0436; F16H 57/045; F16H 57/0476; F16H 61/0031;
(Continued)

(56) References Cited

U.S. PATENT DOCUMENTS 7,156,218 B2 * 1/2007 Yamamoto .......... F16H 63/3416
74/335
7,490,528 B2 * 2/2009 Koski ................. F16H 63/3483
192/219.5
(Continued)

FOREIGN PATENT DOCUMENTS

DE 10 2007 026 599 A1 1/2008
DE 10 2009 026 709 A1 12/2010
(Continued)

OTHER PUBLICATIONS

PCT/EP2021/069399, International Search Report dated Oct. 7, 2021 (Two (2) pages).
(Continued)

*Primary Examiner* — Ha Dinh Ho
(74) *Attorney, Agent, or Firm* — Crowell & Moring LLP

(57) ABSTRACT

A drive device for a motor vehicle includes an electric machine having a gearbox where the motor vehicle is drivable electrically via the gearbox by the electric machine. At least one gear of the gearbox is switchable by operating a switch element. A medium is flowable through a circuit that has a first branch through which the medium is flowable to cool and/or lubricate the electric machine and/or the gearbox and a second branch through which the medium is flowable to operate the switch element. A pump delivers the medium through the circuit. The medium is flowable through a third branch of the circuit to operate the parking lock.

9 Claims, 5 Drawing Sheets

(51) Int. Cl.
*F16H 61/00* (2006.01)
*F16H 61/02* (2006.01)
*F16H 61/30* (2006.01)

(52) U.S. Cl.
CPC ....... *F16H 57/045* (2013.01); *F16H 57/0476* (2013.01); *F16H 61/0031* (2013.01); *F16H 61/0206* (2013.01); *F16H 61/30* (2013.01); *F16H 63/3433* (2013.01); *F16H 2061/0037* (2013.01)

(58) Field of Classification Search
CPC ............ F16H 61/0206; F16H 63/3433; F16H 2061/0037
USPC .......................................................... 74/335
See application file for complete search history.

(56) References Cited

U.S. PATENT DOCUMENTS

| | | | |
|---|---|---|---|
| 7,934,590 | B2 | 5/2011 | Duhaime et al. |
| 9,261,188 | B2 | 2/2016 | Ruehle et al. |
| 9,689,434 | B2 | 6/2017 | Baraga et al. |
| 2003/0019702 | A1* | 1/2003 | Goedecke ............... B60T 7/122 |
| | | | 188/353 |
| 2006/0163024 | A1* | 7/2006 | Yamamoto .......... F16H 63/3425 |
| | | | 192/219.4 |
| 2013/0118852 | A1* | 5/2013 | Schuller .............. F16H 61/0021 |
| | | | 192/48.601 |
| 2013/0319806 | A1* | 12/2013 | Schindler ................ B60T 1/005 |
| | | | 188/353 |
| 2016/0087018 | A1 | 3/2016 | Shim et al. |

FOREIGN PATENT DOCUMENTS

| | | |
|---|---|---|
| DE | 10 2012 016 235 A1 | 2/2014 |
| DE | 10 2015 107 362 A1 | 11/2016 |
| DE | 10 2016 011 148 A1 | 3/2017 |
| DE | 10 2018 112 665 A1 | 11/2019 |
| DE | 10 2018 112 670 A1 | 11/2019 |
| DE | 10 2018 214 430 A1 | 2/2020 |
| JP | 2014-521897 A | 8/2014 |
| WO | WO 2018/055204 A1 | 3/2018 |

OTHER PUBLICATIONS

German-language German Office Action issued in German application No. 10 2020 004 976.1 dated Mar. 4, 2021 (Nine (9) pages).
Japanese-language Japanese Office Action issued in Japanese Application No. 2023-507513 dated Feb. 27, 2024 (4 pages).

* cited by examiner

DRIVE DEVICE FOR A MOTOR VEHICLE, AND MOTOR VEHICLE

BACKGROUND AND SUMMARY OF THE INVENTION

The invention relates to a drive device for a motor vehicle. The invention further relates to a motor vehicle, in particular a motor car.

An arrangement can be taken as known from DE 10 2009 026 709 A1, having at least one switch element which is arranged in a housing of a gearbox and can be hydraulically pressurized with a pressure medium of a pressure medium supply both to couple with and to decouple from at least one component of the gearbox.

The object of the present invention is to create a drive device for a motor vehicle and a motor vehicle having a drive device of this kind, such that a particularly advantageous operation of the drive device can be obtained.

A first aspect of the invention relates to a drive device for a motor vehicle preferably formed as a motor car, in particular as a passenger car. This means that the motor vehicle in its fully manufactured state comprises the drive device and can be driven by means of the drive device, particularly electrically and most particularly purely electrically. In other words, it is preferably provided that the drive device is an electric drive train, by means of which the motor vehicle can be driven electrically, particularly purely electrically. It is thus preferably provided that the motor vehicle is formed as an electric vehicle, in particular as a battery electric vehicle (BEV). The drive device comprises at least one electric machine and a gearbox, via which the motor vehicle can be driven electrically, particularly purely electrically, by means of the electric machine. In order to obtain particularly high levels of electrical power to drive the motor vehicle particularly purely electrically, it is preferably provided that the electric machine is formed as a high-voltage component whose electrical voltage, particularly electrical operating or nominal voltage, is preferably at least 48 volts, particularly at least 50 volts and most particularly at least 60 volts. The electrical voltage, particularly the electrical operating or nominal voltage, of the electric machine is preferably several hundred volts. In order to drive the motor vehicle electrically by means of the electric machine, the electric machine is operated in a motor operation, and thus as an electric motor, for example. The electric machine is provided with electric energy or electrical current for this purpose, the energy or current being provided by an energy storage device of the motor vehicle, for example formed as a battery, and most particularly as a high-voltage battery (HV battery). This means that the gear can be engaged and disengaged. If the gear is engaged, then the motor vehicle can be driven via the gearbox, and thus via the engaged gear by means of the electric machine. If the gear is disengaged, then the motor vehicle cannot be driven via the gear of the electric machine. The drive device, particularly the gearbox, has at least one switch element here, by means of which the gear of the gearbox can be switched by operating the switch element. This means that the gear can be engaged and/or disengaged by operating the switch element. In order to operate the switch element, the switch element is provided or supplied with a preferably fluid medium, as explained in more detail in the following.

The drive device additionally has at least one circuit which can be flowed through by the medium. The medium is preferably a fluid, particularly an oil, such that the medium is also described as a hydraulic medium. The circuit can thus also be described as a hydraulic circuit. The circuit has a first branch and a second branch, which is preferably separated at least partially from the first branch, particularly spatially and/or fluidly. The first branch can be flowed through by the medium to cool and/or lubricate the electric machine and/or the gearbox. In other words, the electric machine and/or the gearbox can be cooled and/or lubricated by means of the medium and by means of the first branch, in particular by at least a part of the gearbox and/or the electric machine being provided or able to be provided with the medium via the first branch. The medium is thus used as a cooling and/or lubricating medium with regard to cooling and/or lubricating the electric machine or the gearbox, in particular in such a way that the electric machine or the gearbox is or can be provided with the medium via the first branch, in order to thus cool and/or lubricate the electric machine or the gearbox by means of the medium. The second branch can be flowed through by the medium to operate the switch element. This means that the medium is used as an operating medium with regard to the second branch and the switch element, in order to operate the switch element by means of the operating medium, and consequently to switch the gear. The switch element becomes able to be provided with or is provided with the medium by means of the second branch. The switch element can thus particularly be operated by means of the medium in such a way that the switch element is provided with the medium via the second branch, and thus particularly supplied with the medium. By supplying the switch element with the medium, a switch part of the switch element can, for example, particularly be moved translationally and/or relatively to a housing of the gearbox, in order to thus switch the gear or cause the gear to switch.

The drive device additionally comprises at least one electric pump for delivering the medium through the circuit. In other words, the electric pump can be electrically operated. The medium is delivered by means of the pump by electrically operating the pump, wherein the medium can be delivered through the circuit, and thus through the branches, by means of the pump. The electric pump comprises a delivery element, for example, which is particularly received in a pump housing and can be moved, particularly rotated, relative to the pump housing. The electric pump additionally comprises an electric motor, for example, which can be operated by means of electrical energy or electrical current. The electric motor of the delivery element can be driven by operating the electric machine, and thus move relative to the pump housing, whereby the medium is or can be delivered by means of the delivery element.

The drive device has a parking lock particularly provided in addition to the switch element in order to now obtain a particularly advantageous operation of the drive device. The parking lock has a well-known function of this kind, so that the motor vehicle can be secured by means of the parking lock against rolling away undesirably, particularly if the motor vehicle is parked on an incline. The motor vehicle has at least two wheels also described as vehicle wheels, for example, which can be electrically driven by the electric machine via the gearbox in order to thus drive the motor vehicle electrically. The vehicle wheels are ground contact elements here, via which the motor vehicle is or can be supported downwards in the vertical direction of the vehicle on a ground. If the motor vehicle is driven along the ground while the motor vehicle is supported on the ground via the ground contact elements downwards in the vertical direction of the vehicle, then the vehicle wheels roll over the ground. The gearbox has a gearbox output shaft here, for example, via which the gearbox can provide a drive torque. The drive torque results from a torque, for example, which is provided by the electric machine to drive the motor vehicle. The parking lock can now be switched between a locked state and a released state, for example. The gearbox output shaft can thus be secured by means of the parking lock against a rotation occurring relative to the housing of the gearbox in the locked state, whereby the vehicle wheels that are connected to the gearbox output shaft particularly for the purpose of permanently transferring torques are also secured against a rotation occurring relative to the housing of the gearbox. The motor vehicle can thus be secured against rolling away undesirably. The parking lock releases the gearbox output shaft and the wheels for a respective rotation occurring relative to the housing of the gearbox in the released state, such that the gearbox output shaft, and thus the motor vehicle, can be driven by the electric machine in the released state. The gearbox output shaft is thus rotated relative to the housing. The gearbox output shaft is secured against a rotation occurring relative to the housing in a form-fit manner by means of the parking lock, in particular in the locked state.

The circuit additionally has a third branch which can be flowed through by the medium to operate the parking lock. This means that the medium can thus be delivered through the circuit by means of the pump, and thus also through the third branch. The parking lock is provided with the medium by delivering the medium through the third branch, and thus operated by means of the medium, wherein the parking lock can be switched from the locked state to the released state and/or from the released state to the locked state by operating the parking lock. It is thus provided according to the invention that at least three functions can be realised by means of the one pump and by means of the one circuit. A first function is cooling and/or lubricating the electric machine and/or the gearbox via the first branch by providing the first branch with the medium by means of the pump or by delivering the medium through the first branch by means of the pump. A second function is operating the switch element by providing the second branch with the medium by means of the pump or by delivering the medium through the second branch by means of the pump. The third function is operating the parking lock by providing the third branch with the medium by means of the pump, or by delivering the medium through the third branch by means of the pump.

The switch element can be switched between a coupled state and a decoupled state, for example. The switch part of the switch element can be moved between a coupled position causing the coupled state and a decoupled position causing the decoupled state, particularly translationally and/or relative to the housing, in particular by operating the switch element. In the coupled state, for example, at least two components of the gearbox are connected to each other in a manner fixed against rotation, in particular in a form-fit manner, by means of the switch element, such that the components connected to each other in a manner fixed against rotation by means of the switch element rotate together or simultaneously and at the same angular speed around a shared axis of rotation relative to the housing, particularly if the gearbox is driven by means of the electric machine. In the decoupled state, the switch element releases the components for a rotation occurring relative to each other around the axis of rotation, such that the components then particularly rotate or can rotate relative to each other in the decoupled state if the gearbox is driven. The switch element is preferably formed as a self-supporting switch element which supports itself independently or automatically in the decoupled state and/or in the coupled state. It is further preferably provided that the parking lock is formed as a self-supporting parking lock, which supports itself independently or automatically in the locked state and/or in the released state. The invention is particularly based on the knowledge that similar or identical requirements with regard to delivery of the medium exist for operating the switch element, for operating the parking lock and for cooling and/or lubricating the electric machine and/or the gearbox, such that these requirements can be fulfilled by means of the same pump. With regard to cooling and/or lubricating the electric machine and/or the gearbox, the pump delivers the medium, and thus causes a volume or mass flow of the medium, wherein the volume or mass flow is used to cool and/or lubricate the electric machine and the gearbox. The volume or mass flow is thus also described as a cooling and/or lubricating volume flow or as a cooling and/or lubricating mass flow. High volume flows at a comparatively low pressure level, for example of 5 bar, are advantageous here for operating the switch element, for operating the parking lock and for cooling and/or lubricating the gearbox and/or the electric machine. The pump can provide high volume flows at a comparatively low pressure level of this kind, or the latter can be caused by means of the pump. In other words, the pump can provide high volume flows of the medium at a low pressure level, and deliver the latter through the branches, such that cooling and/or lubricating the electric machine and/or the gearbox, operating the switch element and operating the parking lock can be realised with a particularly low number of parts, and thus also in an installation space-saving, weight-saving and cost-efficient manner. Furthermore, only low sealing requirements are sufficient with regard to embodiments of sealing surfaces, for example with regard to an installation of the pump in the housing, such that the three functions previously described can be represented in a particularly simple and cost-efficient manner. Moreover, an additional, separate pressure control slide for controlling or adjusting a pressure in the circuit also described as a hydraulic circuit is not required in comparison with conventional solutions, such that the number of parts, and thus the weight, the costs and the installation space requirement can be kept within a particularly low range. The technical complexity of the drive device can additionally be kept low, and a particularly high robustness and a particularly energy-efficient operation can be represented.

In a particularly advantageous embodiment of the invention, the drive device comprises a valve element, via which, particularly optionally, the first branch and the second branch can be provided with the medium delivered by means of the pump. The valve element can be switched between a cool state and an operating state. The cool state is a first switch state, or is described as a first switch state of the valve element, and the operating state is a second switch state, or is described as a second switch state of the valve element. The valve element is preferably formed as a valve element able to be switched electrically, such that the valve element can thus preferably be switched at least from one of the switch states into the other switch state and/or from the other switch state into the one switch state, so that that the valve element is provided with electrical energy or with electrical current. In the cool state, the first branch is fluidly connected to the pump via the valve element, and can thus be provided with the medium delivered by means of the pump via the valve element, while the second branch is fluidly separated from the pump by means of the valve element. Thus, if the valve element is in the cool state, for example, while the medium is delivered by means of the pump, then the medium is delivered into the first branch and through the first branch via the valve element, such that the electric machine and/or the gearbox is provided with the medium, and is thus cooled and/or lubricated by means of the medium, in the cool state. Provision of the second branch, and thus of the switch element with the medium delivered by means of the pump ceases here, however, such that, in particular, an operation of the switch element ceases. In the operating state, however, the second branch is fluidly connected to the pump via the valve element, as a result of which the second branch and thus the switch element can be provided with the medium delivered by means of the pump via the valve element, while the first branch is fluidly separated from the pump by means of the valve element. In order to thus switch the switch element, for example, the valve element is switched into the operating state. If the medium is then delivered by means of the pump, then the medium is delivered to the second branch, and thus in particular to the switch element, by means of the pump via the valve element, whereby the switch element is operated. Delivery of the medium through the first branch caused by the pump ceases here, however. The switch element (second branch) and the first branch can thus be provided with the medium as required in a particularly simple manner. The valve element is thus preferably an electrohydraulic valve element.

It is provided in a further embodiment of the invention that the valve element is switched into the operating state to operate the parking lock in order to be able to operate the parking lock in a particularly simple and energy-efficient manner. This embodiment is particularly based on the knowledge that the cooling or lubrication, i.e., delivery of the medium through the first branch caused by the pump can be simply deactivated or cease without disadvantages during a window of time during which the parking lock is or can be operated by means of the medium. The parking lock can thus be operated in a particularly simple and energy-efficient manner.

A further embodiment of the invention is characterised in that a second valve element provided particularly in addition to the valve element is arranged in the second branch. The second valve element is thus arranged downstream of the first valve element, and particularly downstream of the switch element in the flow direction of the medium flowing from the first valve element to the switch element. The second valve element can be switched between an engaged state and a disengaged state. The engaged state is also described as a first state, or the engaged state is a first state of the second valve element, wherein the disengaged state is a second state or is also described as a second state of the second valve element. The second valve element is preferably formed as an electrical valve element or as a valve element able to be switched electrically, which can thus be switched from one of the states into the other state and/or from the other state into the one state, so that the second valve element is or can be provided with electrical energy or electrical current. The second valve element can thus preferably be an electrohydraulic valve element. In the engaged state, the switch element is fluidly connected to the first valve element via the second valve element, whereby the switch element can be provided with the medium delivered by means of the pump via the valve elements, in particular when the first valve element is in the operating state, whereby the switch element can be operated to engage the gear. In other words, the second valve element is or should be switched into the engaged state, and the first valve element into the operating state, in order to engage the gear, and particularly in order to move the switch part in a first direction, and thus from the decoupled position into the coupled position.

In the disengaged state, the switch element is fluidly connected to the first valve element via the second valve element, whereby the switch element can be provided via the valve elements with the medium delivered by means of the pump, particularly while the first valve element is in the operating state, whereby the switch element can be operated to disengage the gear. In other words, the second valve element is or has been switched into the disengaged state, and the first valve element into the operating state, in order to disengage the gear, and thus particularly to move the switch part in a second direction opposite to the first direction. On the one hand, the switch element can thus be operated as required in a particularly simple, installation space-saving, weight-saving and cost-efficient manner, in order thus to switch the gear as required, and thus to engage or disengage it. On the other hand, by a simple switching of the valve elements, the third branch can be provided as required with the medium delivered by means of the pump. In other words, the parking lock can be operated as required by simple switching of the valve elements. The first valve element can be provided with the medium delivered by means of the pump via a conduit element, for example. For this purpose, the conduit element itself is fluidly connected to the pump on one side, particularly on one end, and fluidly connected to the first valve element on the other side, particularly on the other end. A second conduit element is preferably provided here, which particularly branches off from the first conduit element at a branching point arranged downstream of the pump and upstream of the first valve element, wherein the parking lock can be provided with the medium delivered by means of the pump via the second conduit element. It is particularly conceivable that the second conduit element is a component of the third branch or forms the third branch, such that the third branch branches off from the first conduit element at the branching point, for example.

The parking lock can thus be provided with the medium delivered by means of the pump in a particularly simple manner, for example, such that the first valve element is in the operating state, while the second valve element is in one of the states, wherein in the one state the second valve element is in, operation of the switch element, i.e., movement of the switch part, ceases despite a delivery of the medium effected by means of the pump. As the first branch is thus fluidly separated from the pump, and the switch element is already in a state or a position that can be caused by the one state of the second valve element, such that the switch element is not operated or moved despite delivery of the medium by means of the pump, the medium delivered by means of the pump flows to and into the third branch, and thus to the parking lock via the third branch, whereby the parking lock is operated. In other words again, a sufficient pressure, also described as a system pressure, can build up in the branches fluidly connected to the pump, the branches being the third branch and the second branch, the parking lock being able to be acted upon by the system pressure in order to operate or move the parking lock. It can be irrelevant here whether the switch element formed as a claw or claw clutch, for example, is in the coupled state or the decoupled state, and is thus engaged or disengaged, in other words it can be irrelevant if the gear of the gearbox is engaged or disengaged when the motor vehicle is not moving and the parking lock is in the locked state. It is advantageous here, however, if the second valve element remains unchanged in its engaged state, which the second valve element was in before the parking lock was operated, or its operation was required, while the parking lock is operated, such that the switch part of the switch element, formed as a piston, for example, is not moved although the switch element is fluidly connected to the pump via the valve elements, and the medium is delivered by means of the pump. A sufficient volume flow and a sufficient pressure to operate the parking lock can thus be built up by means of the pump, wherein the pressure of the medium rests on the switch part and can thus particularly be built up particularly quickly, so that movement of the switch part ceases. The background of this embodiment is also that switching processes of the switch element and the parking lock generally do not occur simultaneously, such that these two functions never simultaneously require provision with the medium, for example formed as oil. This particularly applies to all three functions. This embodiment also enables the three functions to be realised without a third locked state of the first valve element, wherein realising a third switch state of this kind would be particularly technically complex. The drive device can thus be operated as required in a particularly simple and cost-efficient manner and in an energy-efficient manner.

A further embodiment is characterised in that the switch element is a form-fit switch element, in particular a claw or a claw clutch. It has been found that operating a form-fit switch element in particular combines particularly well with operating the parking lock and with cooling and/or lubrication, as these three functions have similar or at least substantially the same requirements with regard to delivery of a medium to be brought about by means of a pump.

In a further embodiment of the invention, it is provided that the pump can be operated in a forward operation and in a reverse operation in order to be able to operate the drive device as required in a particularly simple and cost-efficient manner. The forward operation should particularly be understood to mean that the delivery element is driven in the valve element by means of the electric motor in such a way that the delivery element is moved relative to the pump housing in a first movement direction. The reverse operation should particularly be understood to mean that the delivery element is driven in the reverse operation by means of the electric motor in such a way that the delivery element is moved in a second movement direction, opposite to the first movement direction, relative to the pump housing. The forward operation is provided to deliver the medium from the pump to the respective branch. The pump is thus operated in the forward operation, for example, in order to deliver the medium from the pump to the respective branch by means of the pump. In the forward operation, the medium delivered by means of the pump in the forward operation flows from a first connection of the pump to a second connection of the pump. For example, the previously specified first conduit element is fluidly connected to the second connection.

The reverse operation is provided to deliver the medium out of at least a part of the third branch, particularly at least out of a part of the second conduit element, by means of the pump. In the reverse operation, the medium delivered by means of the pump in the reverse operation flows from the second connection to the first connection of the pump, particularly from the third branch and most particularly from the second conduit element, whereby the medium is or can be delivered at least out of a part of the third branch. The parking lock can in particular be particularly advantageously operated via the reverse operation, for example, in particular be disengaged. Disengaging the parking lock should particularly be understood to mean that the parking lock is switched from a locked state into the released state. Switching the parking lock from the released state into the locked state is also described as engaging the parking lock.

In a further embodiment of the invention, it is provided that the gearbox has at least one second switch element provided in addition to the switch element in order to operate the drive device particularly advantageously in a particularly simple and energy-efficient manner. It is further conceivable that the gearbox has a second gear provided in addition to the gear. The second gear can preferably be switched, i.e., engaged and disengaged. The second gear can be switched by operating the second switch element, for example. The second gear can thus be engaged and/or disengaged by operating the second switch element, for example.

The drive device additionally preferably has a second circuit, which can be flowed through by the medium to operate the second switch element. In other words, the medium is delivered through the second circuit in order to operate the second switch element. For this purpose, the drive device comprises a second electric pump, by means of which the medium can be delivered through the second circuit. The previous and following embodiments of the first pump can automatically also be transferred to the second pump, and vice versa.

It has here proved particularly advantageous if the second switch element is a friction-fit switch element, particularly a brake. The second switch element can be a multi-disc clutch or a multi-disc brake, for example.

This embodiment is based on the knowledge that friction-fit switch elements require a higher pressure and a lower volume flow of the medium in comparison with form-fit switch elements in order to switch the friction-fit switch element by means of the medium, particularly to close it and/or to keep it closed. As the drive device preferably has the first circuit and the second circuit, two operating functions can be split between the circuits. A first operating function comprises operating the first switch element, operating the parking lock and providing the first branch with the medium in order thus to lubricate and/or cool the electric machine and/or the gearbox. The second operating function comprises operating the second switch element. The first operating function can be realised by providing or generating a first high volume flow of the medium with a first low pressure by means of the first pump. The second operating function can be realised by realising or providing a second volume flow of the medium that is lower than the first volume flow with a second pressure that is higher than the first pressure by means of the second pump. It can thus further be realised that the second pump is only operated or the medium is only delivered through the second circuit by means of the second pump when the second switch element is switched or engaged or kept closed. A particularly energy-efficient operation can thus be guaranteed.

In a further embodiment of the invention, it is provided that the drive device has a sump shared by the pumps and the circuits, from which the medium can be delivered through the circuits by means of the pumps, in order to be able to keep the eventual costs, installation space requirement and weight particularly low, and thus enable a particularly advantageous operation of the drive device. The sump is thus formed by the medium, for example, or the medium can collect in the sump.

A second aspect of the invention relates to a motor vehicle preferably formed as a motor car, in particular as a passenger car, comprising a drive device according to the first aspect of the invention.

Further advantages, features and details of the invention result from the following description of a preferred exemplary embodiment and with reference to the drawings. The features and combinations of features previously specified in the description and the features and combinations of features specified in the following description of figures and/or shown only in the figures can be used not only in the respectively specified combination, but also in other combinations or in isolation, without leaving the scope of the invention.

DETAILED DESCRIPTION OF THE DRAWINGS

Figure 1:
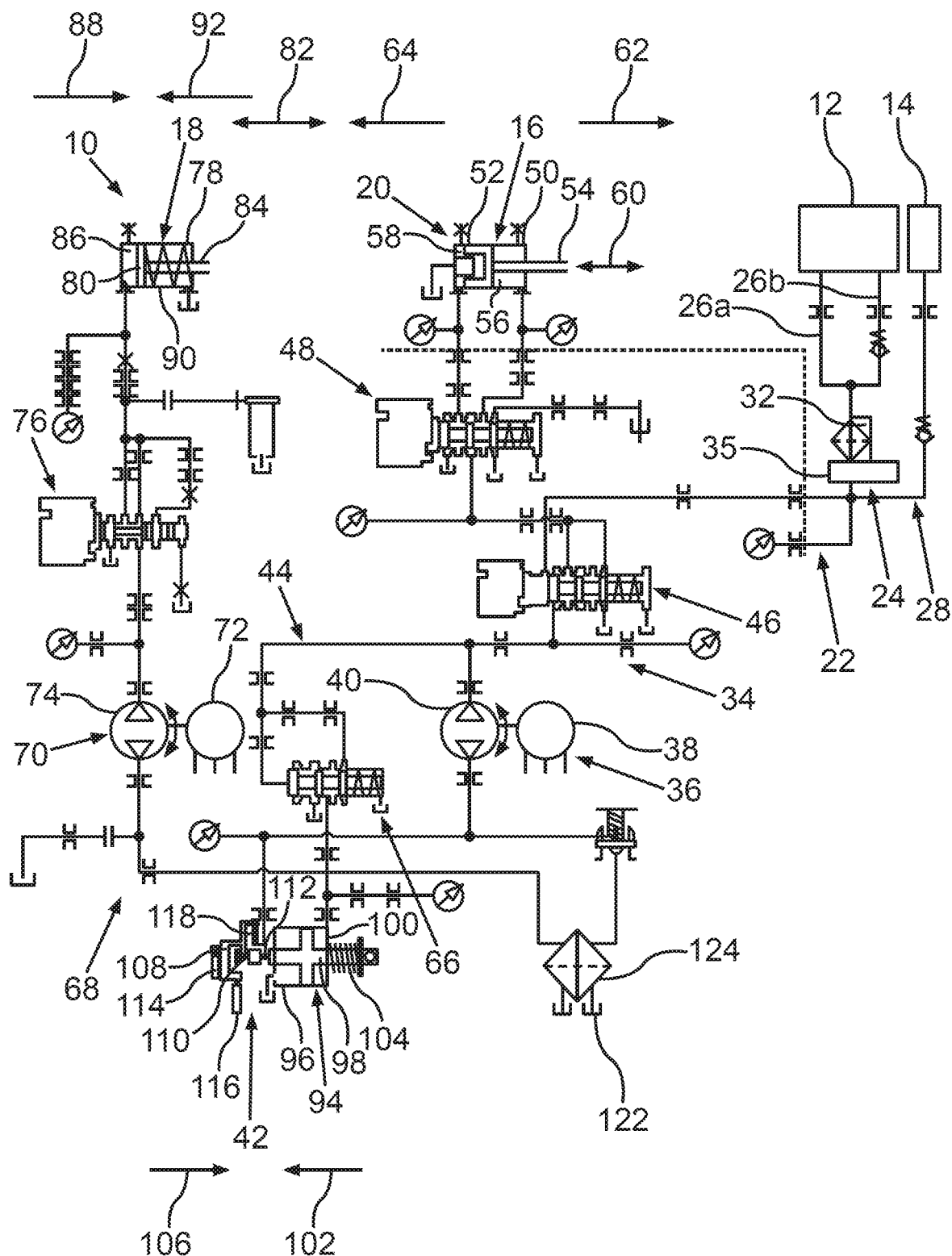
FIG. 1 shows a schematic depiction of a drive device according to the invention for a motor vehicle.

Identical elements, or elements with identical functions, are provided with the same reference numerals in the figures.

FIG. 1 shows a partial view of a drive device 10 of a motor vehicle in a schematic depiction, the motor vehicle preferably being formed as a motor car, particularly as a passenger car. This means that the motor vehicle in its fully manufactured state has the drive device 10 and can be driven, particularly purely electrically, by means of the drive device 10. The drive device 10 has an electric machine 12 particularly schematically depicted in FIG. 1, and a gearbox 14 particularly schematically depicted in FIG. 1, via which the motor vehicle can be driven electrically, particularly purely electrically, by means of the electric machine. The gearbox has at least or exactly two gears that can be switched, i.e., that can be engaged and disengaged, wherein the gears are also described as switching stages and differ from each other with regard to their translations, for example, via which the motor vehicle can be driven by the electric machine 12. The gearbox 14, and thus the drive device 10, have a first switch element 16 and an additionally provided second switch element 18. The first gear can be engaged and disengaged by means of the switch element 16 by operating the switch element 16. The second gear can be engaged and disengaged by means of the switch element 18 by operating the switch element 18. It is preferably provided that the second gear is disengaged when the first gear is engaged. It is preferably provided that the first gear is disengaged when the second gear is engaged. The first gear can thus be switched by means of the switch element 16, wherein the second gear can be switched by means of the switch element 18.

The drive device 10 comprises a first circuit 20, which can be flowed through by a medium that is preferably fluid, and formed as oil, for example. The first circuit 20 comprises a first branch 22 which can be flowed through to cool and/or lubricate the electric machine 12 and the gearbox 14. For this purpose, the branch 22 comprises a first subbranch 24 that can be flowed through by the medium, for example, via which the electric machine 12 can be provided with the medium in order thus to cool and/or lubricate the electric machine 12 by means of the medium. It can be seen from FIG. 1 that the subbranch 24 forks further, and thus has forks 26a, b that can be flowed through by the medium. Different partial regions of the electric machine 12 can thus be provided with the medium via the forks 26a, b, for example, and thus be lubricated and/or cooled by means of the medium. The branch 22 further comprises a second subbranch 28, via which the gearbox 14 can be provided with the medium, in order thus to cool and/or lubricate the gearbox 14 by means of the medium via the subbranch 28. It can be seen that the subbranch 28 and the subbranch 24 are switched in parallel to each other. A cooler 30 for cooling the medium is presently arranged in the subbranch 24 here to cool the medium. The cooler 30 is assigned a bypass conduit 32 which is connected to the subbranch 24 at two connection points. A first of the connection points is arranged in the subbranch 24 upstream of the cooler 30, and the second connection point is arranged in the subbranch 24 downstream of the cooler 30, and upstream of the electric machine 12. At least a part of the medium flowing through the subbranch 24 can thus be removed from the subbranch 24 by means of the bypass conduit 32 at the first connection point, and introduced into the bypass conduit 32. The medium introduced into the bypass conduit 32 flows through the bypass conduit 32, and bypasses the cooler 30 in the process, and thus is not cooled by means of the cooler 30. A valve element 35 preferably formed as a thermostat valve is preferably arranged in the subbranch 24 here, by means of which a quantity of the medium flowing through the bypass conduit 32, and thus bypassing the cooler 30, can be adjusted, particularly depending on a temperature of the medium.

The circuit 20 additionally comprises a second branch 34, which can be flowed through by the medium to operate the switch element 16. This means that the switch element 16 can be provided with the medium via the second branch 34 in order thus to operate the switch element 16 by means of the medium flowing through the second branch 34. The drive device 10 additionally has an electric pump 36 assigned to the circuit 20, by means of which the medium can be delivered through the circuit 20 by operating, particularly electrically operating the pump 36. This means that the branches 22 and 34 can be provided with the medium by means of the pump 36. The pump 36 comprises an electric motor 38 and a delivery element 40 here, the delivery element being arranged in a pump housing of the pump 36, for example. The electric motor 38 is operated by providing the electric motor 38 with electrical energy or with electrical current, whereby the electric motor 38 drives the delivery element 40, and thus moves, in particular rotates, relative to the pump housing.

In order to be able to realize a particularly advantageous, and in particular a particularly energy-efficient operation of the drive device 10 now in a particularly weight-saving, cost-efficient and installation space-saving manner, the drive device 10, particularly the gearbox 14, comprises a parking lock 42. The circuit 20 has a third branch 44 here, which can be at least partially spatially or fluidly separated from the branch 22 and/or from the branch 34. The branch 44 can here be flowed through by the medium to operate the parking lock 42. In other words, in order to operate the parking lock 42, and thus to engage and/or disengage it, the parking lock 42 is provided with the medium delivered by means of the pump 36 via the branch 44. The parking lock 42 can be displaced or switched between an engaged state and a disengaged state. The engaged state is also described as a locked state, wherein the disengaged state is also described as a released state.

The electric machine 12 can be operated in its motor operation, and thus as an electric motor. The electric machine 12 is thus a drive motor in its motor operation, which can provide torques for driving the motor vehicle via its output drive shaft. The torques provided by the drive motor can be introduced into the gearbox 14 via a first waveform (not depicted) of an input shaft of the gearbox, for example, wherein the input shaft is also described as a gearbox input shaft. The gearbox 14 also has a second shaft (not depicted in the Figure), for example, which is an output shaft of the gearbox also described as a gearbox output shaft A drive torque that is provided by the gearbox 14 via its output shaft can result from the respective torque provided by the drive motor via its output drive shaft. The respective torque provided by the drive motor is transformed here by means of the engaged gear of the gearbox 14 according to the translation of the engaged gear, and thus converted or transformed into the drive torque. In the engaged state, the parking lock 42 secures the output shaft of the gearbox 14 against a complete rotation relative to a housing of the gearbox 14, also described as a gearbox housing, in a form fit manner, such that the motor vehicle can be secured against rolling away undesirably when it is parked on an incline, for example. In the disengaged state, however, the parking lock 42 releases the output shaft for a rotation, particularly a free rotation, relative to the gearbox housing, such that the output shaft can be rotated freely or completely several times relative to the gearbox housing in the disengaged state. The parking lock 42 is in its disengaged state in order to thus drive the motor vehicle by means of the electric machine.

The drive device 10 comprises a first valve element 46, which is arranged in the circuit 20, for example. The branches 22 and 34 can be provided with the medium delivered by means of the pump 36 via the valve element 46. The valve element can thus be switched between a cool state and an operating state here. The first branch 22 is fluidly connected to the pump 36 via the valve element 46 in the coupled state, whereby the first branch can be provided with the medium delivered by means of the pump 36 via the valve element 46, while, however, the second branch 34 is fluidly separated from the pump 36 by means of the valve element 46. The valve element 46 is switched into the cool state in order thus to deliver the medium through the branch 22 by means of the pump 36. Provision of the switch element 16 with the medium delivered by means of the pump 36 ceases here. The second branch 34 is fluidly connected to the pump 36 via the valve element 46 in the operating state, whereby the second branch 34 can be provided with the medium delivered by means of the pump 36 via the valve element 46 in the operating state, while, however, the first branch 22 is fluidly separated from the pump 36 by means of the valve element 46. The valve element 46 is switched into the operating state in order thus to operate the switch element 16 and switch the first gear. Delivery of the medium through the branch 22 caused by means of the pump 36 ceases here. The valve element 46 is in the operating state to operate the parking lock 42.

The drive device 10 additionally has a second valve element 48 arranged in the second branch 34, the second valve element being able to be switched between an engaged state and a disengaged state. The switch element 16 is fluidly connected to the first valve element 46 via the second valve element 48 in the engaged state, such that the switch element 16 can be provided with the medium that can be delivered by means of the pump 36 via the valve elements 46 and 48 in the engaged state while the valve element 46 is in the operating state, whereby the switch element 16 can be or is operated in such a way that the first gear is engaged. The switch element 16 is fluidly connected to the first valve element 46 via the second valve element 48 in the disengaged state, such that the switch element 16 can be or is provided with the medium delivered by means of the pump 36 via the valve elements 46 and 48 in the disengaged state, while the first valve element is in the operating state, in such a way that the switch element 16 can be or is operated in such a manner that the first gear is disengaged.

It can be seen from FIG. 1 that the switch element 16 is a housing 50 formed as a cylinder, for example, and a piston 52, arranged in the housing 50 and able to be moved translationally relative to the housing 50, and a piston rod 54 that is connected to the piston 52, and can thus be translationally moved with the piston 52 relative to the housing 50. The piston 52 and the housing 50 delimit a first actuation chamber 56 and a second actuation chamber 58 of the switch element 16. The piston 52 and the piston rod 54 can be moved translationally in a movement direction visualized by an arrow 60 in FIG. 1 relative to the housing 50, wherein the actuation chambers 56 and 58 lie opposite each other in the movement direction. The actuation chamber 58 is fluidly connected to the valve element 46 via the valve element 48 in the engaged state, for example, while the actuation chamber 56 is fluidly separated from the valve element 46 by means of the valve element 48. The actuation chamber 56 is fluidly connected to the valve element 46 via the valve element 48 in the disengaged state, for example, while the actuation chamber 58 is fluidly separated from the valve element 46 by means of the valve element 48. The medium is thus delivered into the actuation chamber 58 via the valve elements 46 and 48 if the valve element 46 is in the operating state and the valve element 48 is in the engaged state and the medium is delivered by means of the pump 36. The piston 52 is thus moved, particularly translationally, relative to the housing 50 in a first direction depicted by an arrow 62 in FIG. 1 and running in parallel to the movement direction, whereby the first gear is engaged. The following is provided to disengage the first gear: the valve element 48 is in its disengaged state, and the valve element 46 is in its operating state, while the medium is delivered by means of the pump 36. The medium is thus delivered into the actuation chamber 56 by means of the pump 36 via the valve elements 46 and 48. The piston 52 is consequently moved, particularly translationally, relative to the housing 50 in a second direction, depicted by an arrow 64 in FIG. 1, opposite to the first direction and running in parallel to the movement direction. The first gear is thus disengaged. It can be seen that the piston 52 is a switch part of the switch element 16, wherein the switch part can be moved in the first direction and in the second direction as required in order thus to engage and disengage the first gear as required.

The switch element 16 is preferably a form-fit switch element, particularly a claw described as a claw coupling. The switch element 16 can thus be switched between a coupled state and a decoupled state, for example, by operating the switch element 16. The switch element can be displaced from the decoupled state into the coupled state, for example, as the piston 52 is moved in the first direction. The switch element is switched from the coupled state into the decoupled state by moving the piston in the second direction, for example. The valve elements 46 and 48 are preferably electrohydraulic valve elements, and can thus be switched electrically between the operating state and the cool state or between the engaged state and the disengaged state.

The first valve element 46 is switched into the cool state, for example, in order to deliver the medium through the branch 22 by means of the pump 36. The valve element 46 is switched into the operating state in order to operate the switch element 16 by means of the pump 36. The engaged state and the disengaged state of the valve element 48 are also described in summary as states of the valve element 48. In order to be able to operate the parking lock 42 in a particularly short time, for example, and thus to be able to move the parking lock from the engaged state into the disengaged state, and/or from the disengaged state into the engaged state, the valve element 46 is switched into the operating state, for example, and the valve element 48 is switched into that state which, when the valve element 46 is in the operating state and the medium is delivered by means of the pump 36, causes a movement of the piston 52 resulting therefrom or an operation of the switch element 16 resulting therefrom to cease. If the first gear is thus disengaged when an operation of the parking lock 42 should occur, for example, then the valve element 48 is switched into its disengaged state. If, however, the first gear is engaged when an operation of the parking lock 42 should occur, then the valve element 48 is switched into its engaged state. A high pressure of the medium can then be built up in a short space of time when the medium is delivered by means of the pump 36, the pressure of the medium being supported on the piston 52 via the valve elements 46 and 48, for example, such that the parking lock 42 can be operated by means of the pressure without the piston 52 first having to be moved over an excessive distance, and particularly having to be moved into one of its end positions in the process. It can be seen that a third valve element 66, also described as a slide switch and whose function is explained in more detail in the following, is arranged in the branch 44. The slide switch is particularly arranged downstream of the pump 36 and upstream of the parking lock 42 in the flow direction of the medium flowing through the branch 44.

The gearbox 14, and thus the drive device 10, additionally comprise the switch element 18, which is presently preferably formed as a friction-fit switch element, and here particularly as a multi-disc clutch. The drive device 10 additionally has a second circuit 68 here, which is preferably at least partially fluidly and/or spatially separated from the circuit 20. The circuit 68 can be flowed through by the medium to operate the switch element 18 here, wherein the second gear can be engaged and/or disengaged by operating the switch element 18. The drive device 10 additionally comprises a second electric pump 70 provided in addition to the pump 36 and by means of which the medium can be delivered through the circuit 68. The pump 70 comprises a second electric motor 72 and a second delivery element 74, which is arranged in a second pump housing of the pump 70, and can be moved, particularly rotated, relative to the second pump housing. The medium is delivered by means of the delivery element 74 by moving the delivery element 74 relative to the second pump housing. The electric motor 72 is operated by providing the electric motor 72 with electrical energy or electrical current. The electric motor 72 drives the delivery element 74 by operating the electric motor 72, whereby the delivery element 74 is moved, particularly rotated, relative to the second pump housing. A fourth valve element 76 formed as a controlled pressure relief valve, for example, is arranged in the circuit 68, via which fourth valve element 76 the switch element 18 can be provided with the medium delivered by means of the pump 70.

It can be recognized from FIG. 1 that the switch element 18 has a housing 78 formed as a cylinder, for example, and a piston which is, particularly translationally, movably received in the housing 78. The piston 80 can be moved, particularly translationally, relative to the housing 78 in a piston movement direction depicted by a double arrow 82 in FIG. 1. The switch element 18 additionally has a piston rod 84 that is connected to the piston 80, and can thus be moved with the piston 80 relative to the housing 78. The medium can be delivered into an actuation chamber 86 of the switch element 18 by means of the pump 70 via the valve element 76, wherein the actuation chamber 86 is delimited by the piston 80 and the housing 78. The piston 80 is moved relative to the housing 78 in a first operating direction running in parallel to the piston movement direction and depicted by an arrow 88 in FIG. 1 by delivering the medium into the actuation chamber 86. The switch element or the multi-disc clutch is thus closed, for example. A spring element 90 of the switch element 18 is tensioned via movement of the piston 80 in the first operating direction occurring relative to the housing 78. The spring element 90 can be or is supported on the piston 80 in the piston movement direction on one side and on the housing 78 on the other side, for example. The spring element 90 provides a spring force via tensioning of the spring element 90. The piston 80 can be moved relative to the housing 78 in a second operating direction visualized in FIG. 1 by an arrow 92, running in parallel to the piston movement direction and opposite to the first operating direction by means of this spring force. The multi-disc clutch is thus opened, for example. The second gear is engaged by closing the multi-disc clutch, for example. The second gear is disengaged by opening the multi-disc clutch, for example.

In order to operate the parking lock 42, particularly electrically, the parking lock comprises a hydraulic cylinder 94 that comprises a housing 96 and a piston 98 also described as a locking piston. The locking piston is arranged in the housing 96 in an at least partially translationally moveable manner, and can be translationally moved relative to the housing 96. The piston 98 and the housing 96 delimit an operating chamber 100, into which the medium can be delivered via the branch 44, for example by means of the pump 36, whereby the locking piston is moved translationally relative to the housing 96 in a parking lock direction depicted by an arrow 102 in FIG. 1. The parking lock 42 is thus operated hydraulically, and thus disengaged, for example.

The hydraulic cylinder 94 additionally comprises an actual mechanical spring element 104, which is coupled with the locking piston on one side and at least indirectly with the housing 96 and/or with the gearbox housing on the other. The spring element 104 is tensioned by the piston moving in the first parking lock direction. The spring element 104 thus provides a spring force that acts in a second direction opposite to the first parking lock direction and depicted by an arrow 106 in FIG. 1. The locking piston can be moved translationally relative to the housing 96 in the second parking lock direction opposite to the first parking lock direction by means of the spring force provided by the spring element 104, whereby the parking lock is engaged in a spring-operated or spring force-operated manner.

The parking lock 42 additionally comprises a latching element 108 here, which can be moved relative to the housing 96 between a latched position and an unlatched position. The latching element 108 can particularly be pivoted around a pivot axis relative to the gearbox housing or relative to the housing 96 between the latched position and the unlatched position. If the parking lock 42 is engaged while the latching element 108 is in the latching position, then the latching element 108 engages in a first recess 110 of the locking piston, whereby the latching element 108 works together with the locking piston in a form-fit manner. The locking piston is thus secured in a form-fit manner by means of the latching element 108 against a movement from an engaged position of the locking piston causing the engaged state of the parking lock 42 into a disengaged position of the locking piston causing the disengaged state of the parking lock 42, such that the parking lock 42 remains securely engaged. The locking piston can be moved translationally relative to the housing 96 between the engaged position and the disengaged position here. If the locking piston is in the disengaged position, for example, i.e., if the parking lock 42 is disengaged, while the latching element 108 is in the latched position, then the latching element 108 engages in a second recess 112 of the locking piston, whereby the latching element 108 works together with the locking piston in a form-fit manner. The locking piston is thus held in the disengaged position by means of the latching element 108, particularly against the spring force provided by the spring element 104, and is thus secured in a form-fit manner against a movement from the disengaged state into the engaged state.

The latching element 108 is moved, particularly pivoted, from the latched state into the unlatched state in order to move the locking piston from the engaged position into the disengaged position or, vice versa, from the disengaged position into the engaged position, and thus to be able to displace the parking lock 42 from the engaged state to the disengaged state or, vice versa, from the disengaged state into the engaged state. The latching element 108 is thus stopped from working together with the locking piston in a form-fit manner, such that the locking piston moves, in particular can be displaced, from the engaged position into the disengaged position or from the disengaged position into the engaged position. Via movement, particularly pivoting, of the latching element 108 from the latched position into the unlatched position, a mechanical spring element 114 of the parking lock 42 is preferably tensioned, particularly compressed, such that the spring element 114 provides a spring force at least in the unlatched position. The latching element 108 can be moved from the unlatched position into the latched position, and thus be brought to engage with the respective recess 110 or 112 by means of the spring force provided by the spring element 114, particularly if the locking piston is in the engaged position or in the disengaged position.

The parking lock 42 comprises a preferably electrically and/or hydraulically operated actuator 116 in order now to be able to move the latching element 108 as needed from the latched position into the unlatched position, particularly against the spring force provided by the spring element 114. In the exemplary embodiment shown in FIG. 1, the actuator 116 is formed as a solenoid. The solenoid has a housing and a rotor, which is driven at least partially out of the housing of the solenoid by the solenoid being provided with electrical energy. The latching element 108 is thus moved, particularly pivoted, from the latched position into the unlatched position by means of the rotor. Alternatively or in addition, the parking lock 42 can have a further hydraulic cylinder 118, by means of which the latching element 108 can be moved hydraulically from the latched position into the unlatched position.

Figure 2:
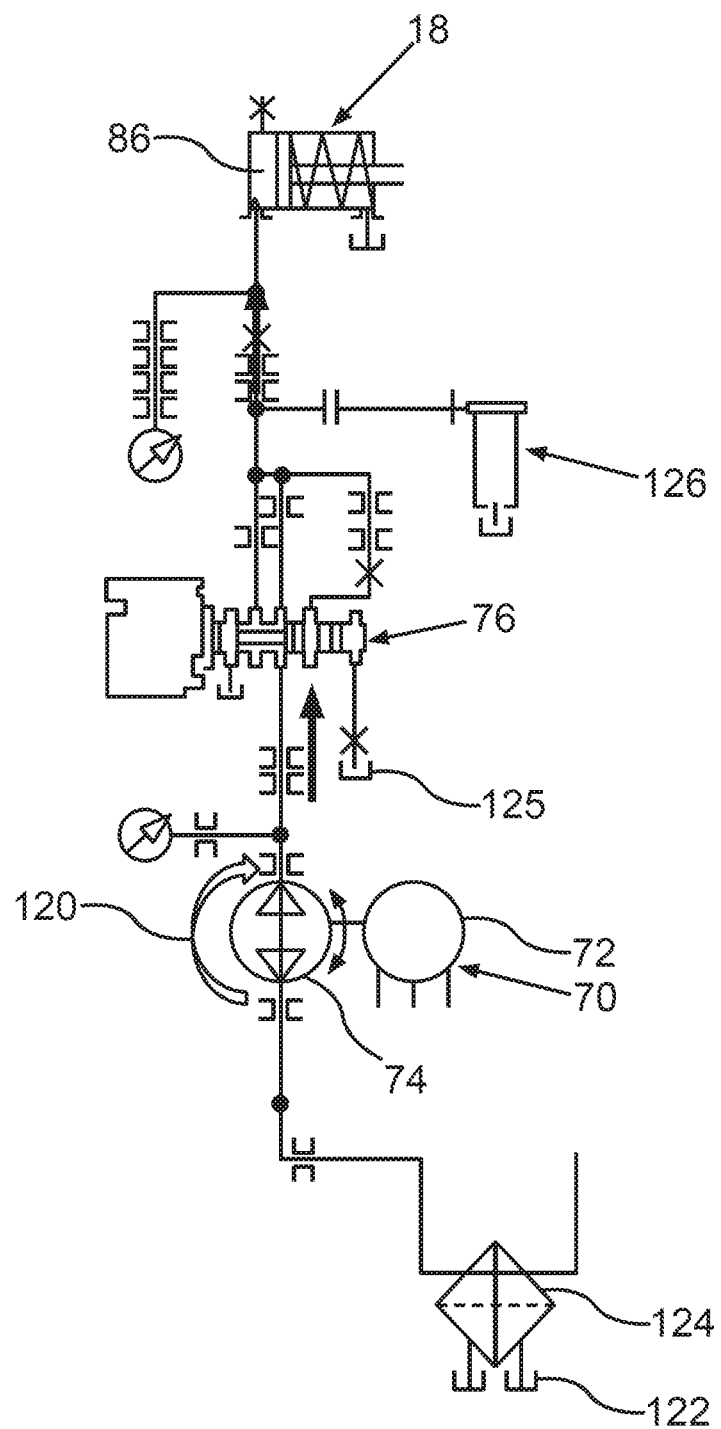
FIG. 2 shows a partial view of a schematic depiction of the drive device.

Provision of the switch element 18 with the medium, and delivering the medium into the actuation chamber 86, can be seen particularly clearly from FIG. 2. For this purpose, the delivery element 74 is moved, particularly rotated, by means of the electric motor 72 relative to the pump housing of the pump 70 in a first pump direction depicted by an arrow 120. It can additionally be seen from FIGS. 1 and 2 that the drive device 10 has a sump 122 shared by the pumps 36 and 70, and thus the circuits 20 and 68, in which the medium can be or is received. The drive device 10 additionally has a filter 124 shared by the pumps 36 and 70, and thus by the circuits 20 and 68, which is arranged downstream of the sump 122 and upstream of the respective pump 36 or 70 in the flow direction of the medium flowing from the sump 122 to the respective pump 36 or 70. The medium flowing from the sump 122 to the respective pump 36 or 70 is filtered by means of the filter 124. The filter 124 is also described as a double filter here. The filter 124 has at least or exactly one intake opening per pump 36 or 70, however, wherein the intake openings are separated from each other. The pump 70 can thus suction the medium from the sump 122, depending on the intake openings, exclusively via a first intake opening, for example, and deliver the medium to the pump itself. The pump 36 can thus additionally suction the medium from the sump 122, depending on the intake openings, exclusively via a second intake opening separated from the first intake opening, and deliver the medium to the pump itself. A function of the circuit 68 particularly comprises providing the switch element 18, for example formed as a brake, particularly as a multi-disc or friction brake, with the medium with the minimum possible medium excess. The medium delivered by means of the pump 70 to the valve element 76, via the valve element 76 to the switch element 18 is dammed at a tank edge of the valve element 76, for example, whereby a desired pressure of the medium, particularly in the entire circuit 68, is adjusted, particularly controlled. If the brake is switched or engaged, then the pump 70 permanently works against a pressure resistance particularly caused by the engaged brake, for example. The pump 70 has a minimum speed of rotation, for example, via which an excess quantity of the medium is generated. This excess quantity balances out a leakage, which can be used to cool the discs of the brake, for example. A further part of the excess quantity, as long as it is present, can be diverted into a tank 125. A reserve for a damper labelled 126 can additionally be seen in FIG. 2.

Figure 3:
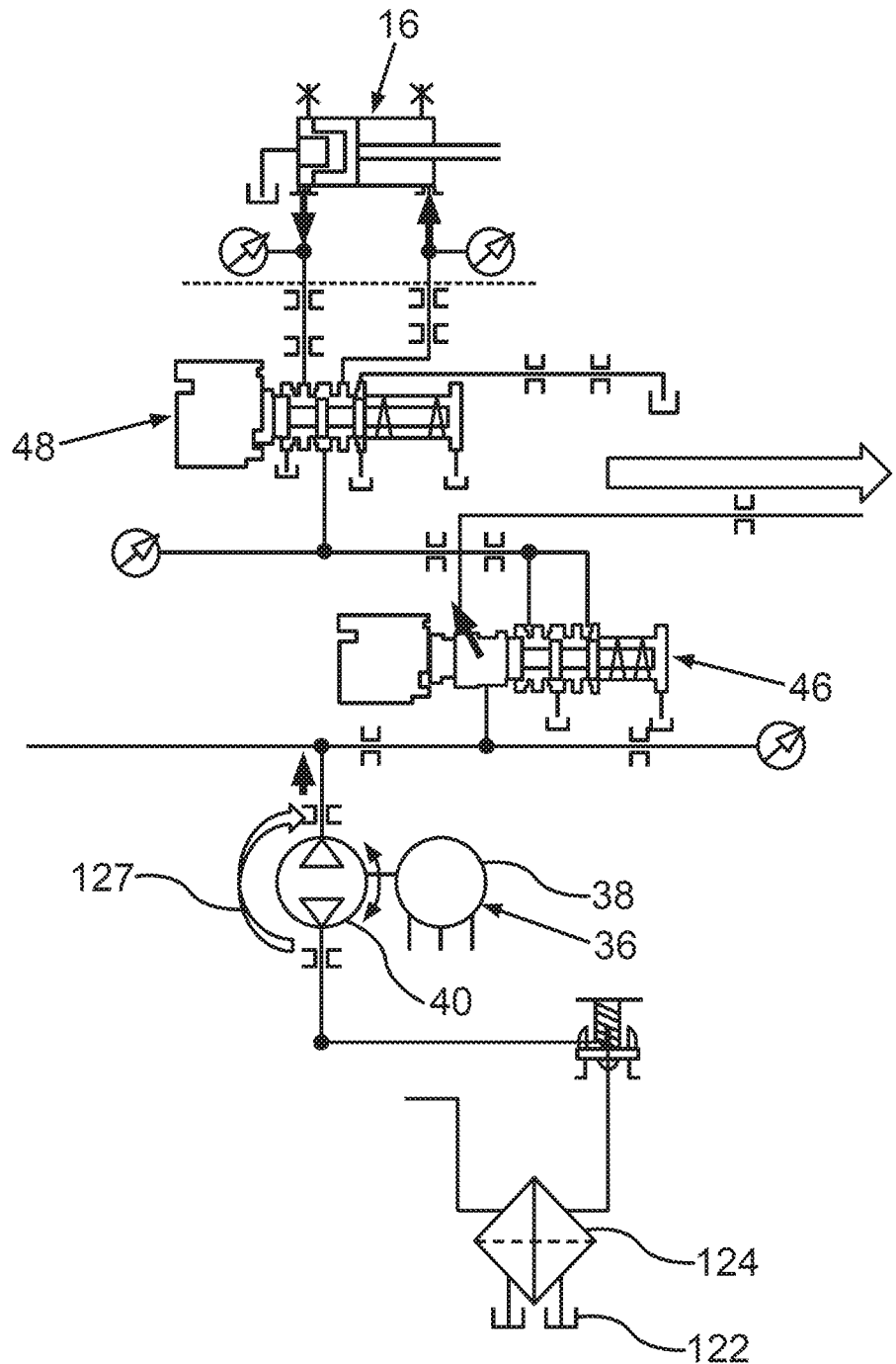
FIG. 3 shows a partial view of a further schematic depiction of the drive device.

Provision of the switch element 18 with the medium can be seen particularly clearly in FIG. 3. It can additionally be seen from FIG. 3 that the pump 36 provides both the switch element 18 and the branch 22 with the medium to cool and/or lubricate the electric machine 12 and the gearbox 14. For this purpose, the pump 36 is operated in a forward operation, in which the electric motor 38 drives the delivery element 40 in such a manner that the delivery element 40 is effected, particularly rotated, relative to the pump housing of the pump 36 in a first delivery element direction depicted by an arrow 127 in FIG. 3. If the switch element 18 is controlled, and thus operated, then provision of the branch 22 with the medium delivered by means of the pump 36 is interrupted for a window of time during which the switch element 18 is operated. A control principle is depicted in the following. The valve element 48 is switched into the engaged state or disengaged state depending on whether the first gear should be engaged or disengaged. The valve element 48 is first switched into its cool state. The pump 36, particularly the delivery element 40, is brought up to its maximum rotation speed, for example. A volume flow of the medium caused or obtained or delivered by means of the pump 36 is instantly diverted from the branch 22 to and into the branch 34, and thus to the switch element 18, via the valve element 46, particularly by instantly switching the valve element 46 from the cool state into the operating state, whereby the switch element 18 can be operated or switched particularly quickly.

Figure 4:
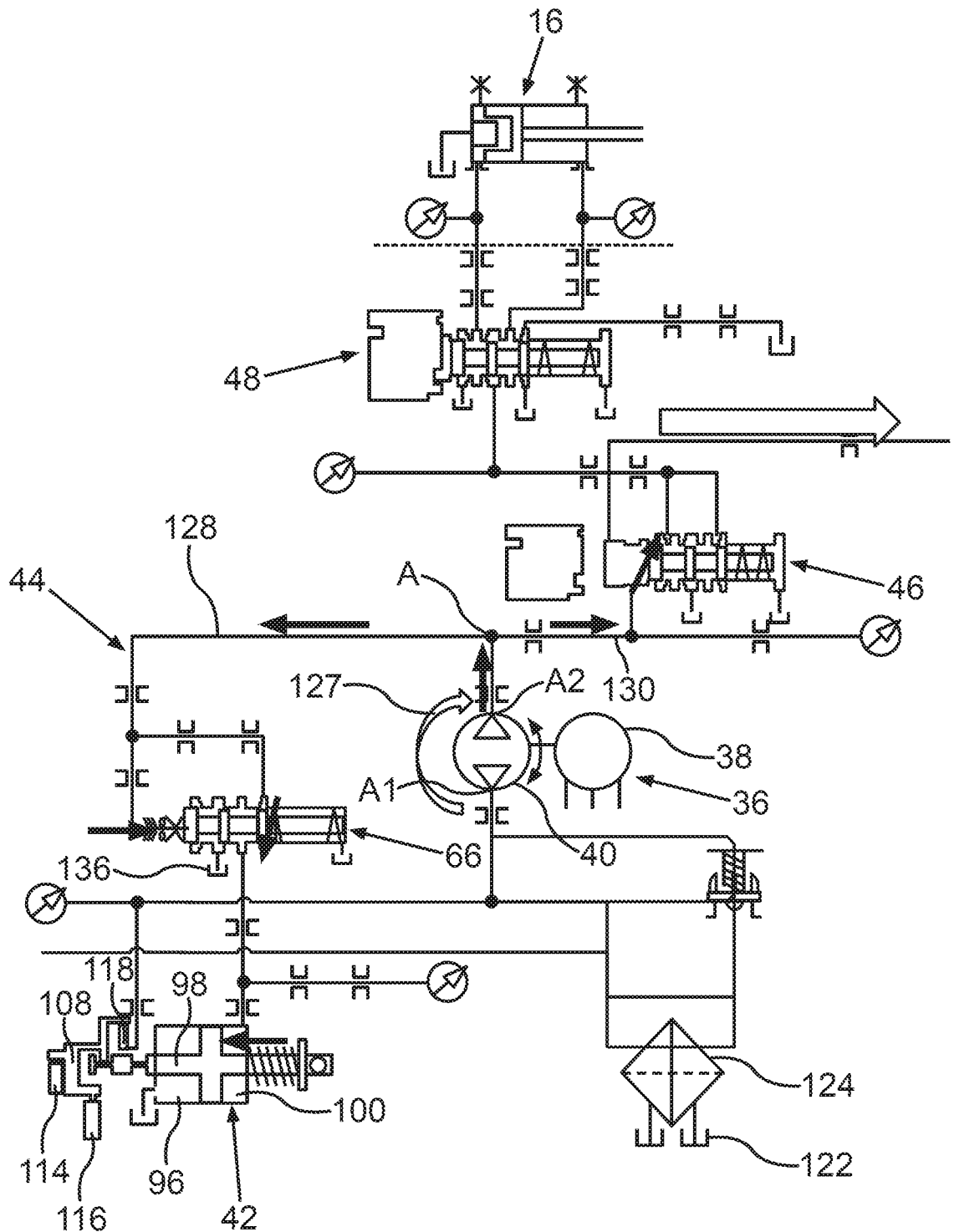
FIG. 4 shows a partial view of a further schematic depiction of the drive device.

The disengagement of the parking lock 42 is depicted in the following with reference to FIG. 4. The pump 36 is operated in its forward operation to disengage the parking lock 42, and the delivery element 40 is thus moved, particularly rotated (arrow 127) in the first delivery element direction by means of the electric motor 38. As previously described, the valve element 48 is switched into the state which, when the pump 36 delivers the medium and the valve element 46 is in the operating state, causes a movement of the piston 52 resulting therefrom to cease. The valve element 46 is thus switched into the operating state to disengage the parking lock 42. The solenoid is energized, for example, whereby the locking piston is unlatched. The pump 36 delivers the medium preferably formed as oil, first in the direction of the switch element 18 and to the slide switch, for example. As the piston 52 is not moved, and thus the switch element 18 does not remove any medium from the pump 36, a pressure builds up via which the slide switch is particularly moved from a starting position of the slide switch into a switching position. A supply line 128, particularly of the branch 44, is thus fluidly connected to the operating chamber 100 via the slide switch, whereby the locking piston is moved into the disengaged position against the spring force provided by the spring element 104. The energisation of the solenoid is then shut off or ended, whereby the locking piston is latched. It can be seen that the pump 36, particularly its pump housing, has a first connection A1 and a second connection A2. The pump 36 is or can be fluidly connected to the sump 122 via the connection A1, for example, such that the pump 36 can suction the medium from the sump 122 via its connection A1. The valve element 46 can be provided with the medium delivered by means of the pump 36 via the connection A2, such that the connection A2 is or can be fluidly connected to the valve element 46, for example. For this purpose, a first conduit element 130 is provided, which is fluidly connected to the connection A2 on one side, particularly on one end, and is fluidly connected to the valve element 46 on the other side or other end. The supply line 128 is a second conduit element here, which is fluidly connected to the first conduit element 130 at a branching point A. The branching point A is arranged downstream of the connection A2, and thus downstream of the pump 36 and upstream of the valve element 46 in the flow direction of the medium flowing through the conduit element 130, and from the connection A2 to the valve element 46 in the process. It can be seen that the supply line 128 branches off from the conduit element 130 at the branching point A. It can further be seen that the parking lock 42 or the operating chamber 100 can be provided with the medium delivered by means of the pump 36 via the supply line 128, in particular in order thus to disengage the parking lock 42.

Figure 5:
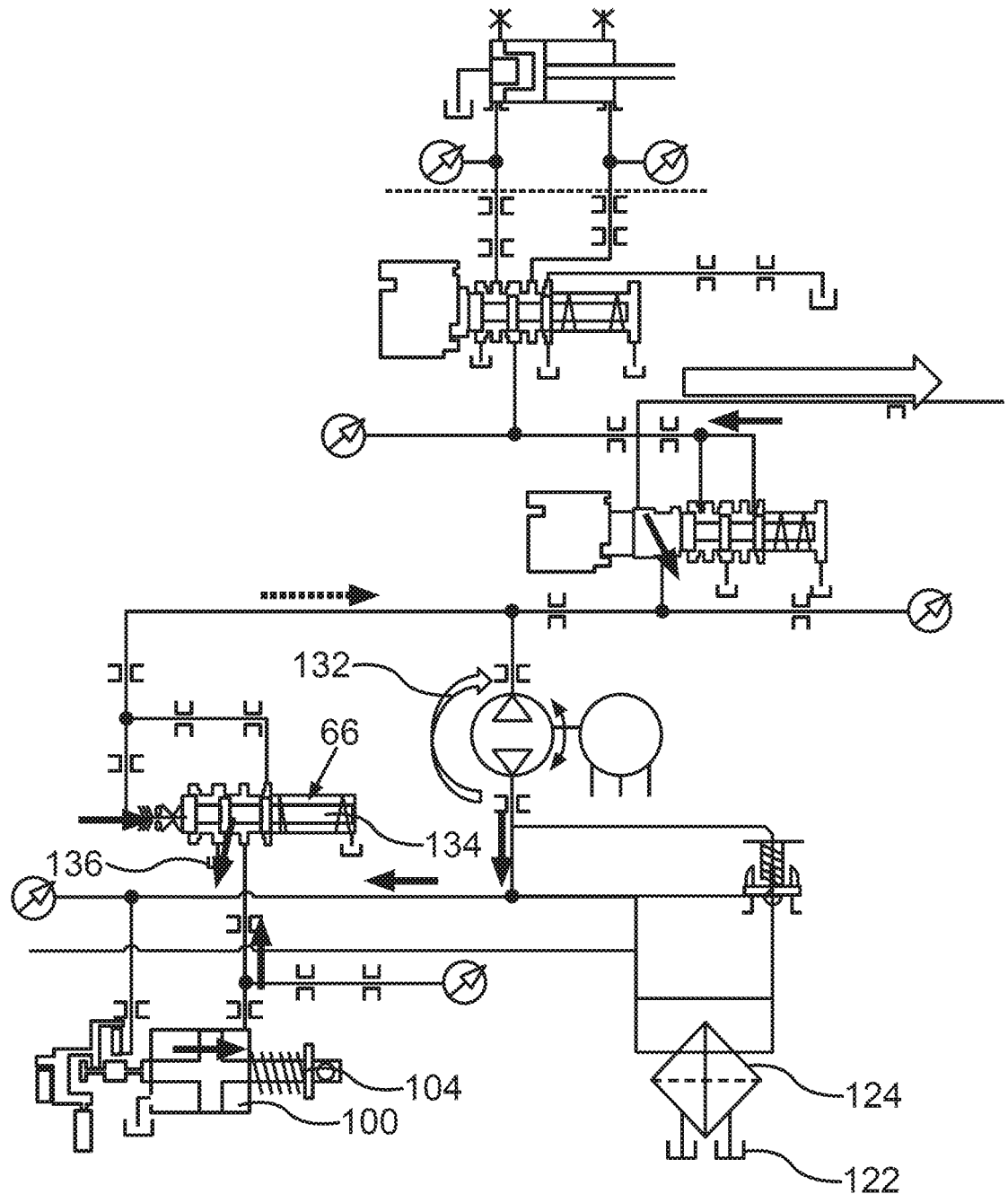
FIG. 5 shows a partial view of a further schematic depiction of the drive device.

The engaging of the parking lock 42 is finally depicted with reference to FIG. 5. The valve element 46 is switched in the cool state, for example. The pump 36 is operated in its reverse operation. By this should be understood that the electric motor 38 drives the delivery element 40 in such a manner that the delivery element 40 is moved, particularly rotated, relative to the pump housing of the pump 36 in a second delivery element direction opposite to the first delivery direction depicted by an arrow 132 in FIG. 5. While the medium delivered by means of the pump 36 in the forward operation flows from the connection A1 to the connection A2 in the forward operation, the medium delivered by means of the pump 36 in the reverse operation flows from the connection A2 to the connection A1 in the reverse operation. The medium is removed or suctioned or sucked in from the parking lock 42, particularly from the operating chamber 100, by means of the pump 36 via the reverse operation. A switching pressure supported on the slide switch, which led to the movement of the slide switch from the starting position into the switch position when the parking lock 42 was disengaged, plummets, whereby the slide switch also simply described as a slide is moved into its starting position also described as a base position, particularly by means of a spring force provided by a spring element 134. The particularly mechanical spring element 134 is tensioned, for example, by moving the slide switch from the starting position into the switching position, whereby the spring element 134 provides the spring force, by means of which the switch slide is moved from the switching position back into the starting position. The operating chamber 100 also described as a piston chamber is fluidly connected to a tank 136 via the slide switch in the starting position, such that the medium first received in the operating chamber 100 can flow into the tank 136 via the slide switch, and thus flow out of the operating chamber 100. The locking piston is consequently moved, particularly displaced, out of the disengaged position into the engaged position by means of the particularly mechanical spring element 104, whereby the parking lock 42 is engaged. Of course, the solenoid is first energized or controlled, in order thus to allow the movement of the locking piston from the disengaged position into the engaged position that is caused or able to be caused by means of the spring force of the spring element 104. If the locking piston has reached its engaged position, then the energisation of the solenoid is ended or shut off, whereby the locking piston is latched again. Engaging the parking lock 42 in this manner is preferably redundant, as the latching element 108 can be effected both by means of the actuator 116, and thus electrically, and by means of the hydraulic cylinder 118, and thus hydraulically.

LIST OF REFERENCE CHARACTERS

10 drive device
12 electric machine
14 gearbox
16 switch element
18 switch element
20 circuit
22 branch
24 subbranch
26a, b fork
28 subbranch
30 cooler
32 bypass conduit
34 branch
35 valve element
36 pump
38 electric motor
40 delivery element
42 parking lock
44 branch
46 valve element
48 valve element
50 housing
52 piston
54 piston rod
56 actuation chamber
58 actuation chamber 60 double arrow
62 arrow
64 arrow
66 valve element
68 circuit
70 pump
72 electric motor
74 delivery element
76 valve element
78 housing
80 piston
82 double arrow
84 piston rod
86 actuation chamber
88 arrow
90 spring element
92 arrow
94 hydraulic cylinder
96 housing
98 piston
100 operating chamber
102 arrow
104 spring element
106 arrow
108 latching element
110 recess
112 recess
114 spring element
116 actuator
118 hydraulic cylinder
120 arrow
122 sump
124 filter
125 tank
126 reserve
127 arrow
128 supply line
130 conduit element
132 arrow
134 spring element
136 tank
A branching point
A1, A2 connection

The invention claimed is:

1. A drive device (10) for a motor vehicle, comprising:
an electric machine (12) having a gearbox (14), wherein the motor vehicle is drivable electrically via the gearbox (14) by the electric machine (12);
a first switch element (16), wherein at least one gear of the gearbox (14) is switchable by operating the first switch element (16);
a first circuit (20), wherein a medium is flowable through the first circuit (20), wherein the first circuit (20) has a first branch (22) through which the medium is flowable to cool and/or lubricate the electric machine (12) and/or the gearbox (14), and wherein the first circuit (20) has a second branch (34) through which the medium is flowable to operate the switch element (16);
a first pump (36), wherein the first pump (36) delivers the medium through the first circuit (20); and
a parking lock (42), wherein the medium is flowable through a third branch (44) of the first circuit (20) to operate the parking lock (42);
wherein the first pump (36) is operable in a forward operation to deliver the medium from the first pump (36) to a respective branch (22, 34, 44) and wherein in the forward operation the medium delivered by the first pump (36) in the forward operation flows from a first connection (A1) of the first pump (36) to a second connection (A2) of the first pump (36);
wherein the first pump (36) is operable in a reverse operation in which the medium delivered by the first pump (36) in the reverse operation flows from the second connection (A2) to the first connection (A1) such that the medium is delivered at least out of a part of the third branch (44).

2. The drive device (10) according to claim 1, further comprising a first valve element (46), wherein the first valve element (46) provides the first branch (22) and the second branch (34) with the medium delivered by the first pump (36) and wherein the first valve element (46) is switchable between:
a cool state in which the first branch (22) is fluidly connected to the first pump (36) via the first valve element (46) such that the first branch (22) is provided with the medium delivered by the first pump (36) via the first valve element (46) while the second branch (34) is fluidly separated from the first pump (36) by the first valve element (46); and
an operating state in which the second branch (34) is fluidly connected to the first pump (36) via the first valve element (46) such that the second branch (34) is provided with the medium delivered by the first pump (36) via the first valve element (46) while the first branch (22) is fluidly separated from the first pump (36) by the first valve element (46).

3. The drive device (10) according to claim 2, wherein the first valve element (46) is switched into the operating state to operate the parking lock (42).

4. The drive device (10) according to claim 2, further comprising a second valve element (48) disposed in the second branch (34), wherein the second valve element (48) is switchable between:
an engaged state in which the first switch element (16) is fluidly connected to the first valve element (46) via the second valve element (48) such that the first switch element (16) is provided with the medium delivered by the first pump (36) via the first and second valve elements (46, 48) and such that the first switch element (16) is operable to engage the at least one gear of the gearbox (14); and
a disengaged state in which the first switch element (16) is fluidly connected to the first valve element (46) via the second valve element (48) such that the first switch element (16) is provided with the medium delivered by the first pump (36) via the first and second valve elements (46, 48) and such that the first switch element (16) is operatable to disengage the at least one gear of the gearbox (14).

5. The drive device (10) according to claim 1, wherein the first switch element (16) is a form-fit switch element.

6. The drive device (10) according to claim 1, further comprising a second switch element (18), a second circuit (68) which is flowable through by the medium to operate the second switch element (18), and a second pump (70) for delivering the medium through the second circuit (68).

7. The drive device (10) according to claim 6, wherein the second switch element (18) is a friction-fit switch element.

8. The drive device (10) according to claim 6, further comprising a sump (122) shared by the first and second pumps (36, 70) and the first and second circuits (20, 68), wherein from the sump (122) the medium is deliverable through the first and second circuits (20, 68) by the first and second pumps (36, 70).

9. A motor vehicle, comprising:
the drive device (10) according to claim 1.

\* \* \* \* \*